(No Model.)
J. W. FOWLER.
METALLIC STOPPER FOR BOILER TUBES.
No. 253,691. Patented Feb. 14, 1882.
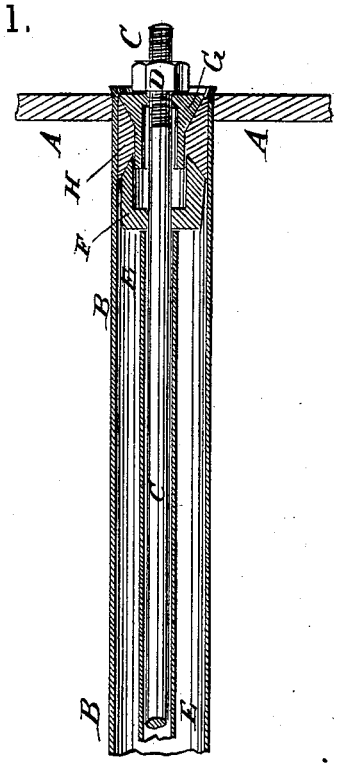
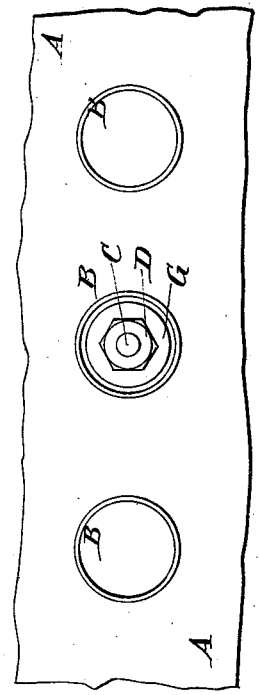
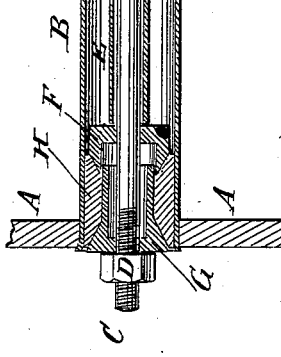
WITNESSES:
Chas. Nida.
C. Sedgwick
INVENTOR:
J. W. Fowler
BY Munn & Co.
ATTORNEYS.

UNITED STATES PATENT OFFICE.

JOHN W. FOWLER, OF BROOKLYN, NEW YORK.

METALLIC STOPPER FOR BOILER-TUBES.

SPECIFICATION forming part of Letters Patent No. 253,691, dated February 14, 1882.

Application filed October 21, 1881. (No model.)

*To all whom it may concern:*

Be it known that I, JOHN W. FOWLER, of Brooklyn, in the county of Kings and State of New York, have invented a certain new and useful Improvement in Metallic Stoppers for Boiler-Tubes, of which the following is a full, clear, and exact description.

Reference is to be had to the accompanying drawings, forming a part of this specification, in which similar letters of reference indicate corresponding parts in both the figures.

Figure 1 is a longitudinal section of my improvement shown as applied to a boiler-tube. Fig. 2 is an end view of the same.

The object of this invention is to provide a simple, convenient, and expeditious means for closing boiler-tubes in case a leakage occurs in the said tubes.

A represents the end plates, and B a tube of a tubular boiler.

C is a rod of such a length as to pass entirely through the boiler, and which has a screw-thread and a nut, D, upon each end. Upon the middle part of the rod C is placed a tubular washer, E, against the ends of which rest blocks F. The blocks F are perforated for the passage of the rod C, fit loosely into the tube B, and are countersunk from their outer ends to receive the tubular inner ends of the outer blocks, G, which are also perforated to receive the rod C and fit loosely into the tube B. The outer ends of the inner blocks, F, are tapered and the outer ends of the outer blocks, G, are flared, as shown in Fig. 1, so as to form ring-recesses with inclined sides around the inner parts of the blocks G, to receive rings or collars H, of lead, of such a size as to pass loosely through the tube B. With this construction, when the improvement is to be used it is passed through the tube to be stopped, the tubular washer E being made of such a length that the outer ends of the outer blocks, G, will be at the outer ends of the boiler-tube B. One of the nuts D is then screwed up, which forces the outer blocks, G, inward and presses the lead rings or collars H outward against the inner surface of the ends of the tube B and tightly closes the said ends.

I am aware that it is not broadly new to stop the leak in a boiler-tube by an interior pipe having a collar and nut at one end, so that a packing may be compressed between said boiler-tube and pipe over the leak; also, that a screw with nut at each end has been used without the tube or pipe on the inside of boiler-tube, to act upon the devices which press the packing in place; but I combine the screw-rod and tube, so that my packing is not between my tube E and boiler-tube, while my inner tube, E, serves as a washer to support the loose blocks F F against the pressure brought to bear upon the loose blocks G G by screwing the nuts on the rod C toward each other.

Having thus described all that is necessary to a full understanding of my invention, what I claim as new is—

The combination, with a tube, B, of the end-threaded rod C, the nuts D D, the tubular washer E, surrounding said rod, the centrally-perforated loose blocks F G, respectively tapered and flared, and the leaden collars H, all constructed and arranged substantially as shown and described.

JOHN W. FOWLER.

Witnesses:
JAMES T. GRAHAM,
C. SEDGWICK.